US008890878B2

(12) United States Patent
Katsukura et al.

(10) Patent No.: US 8,890,878 B2
(45) Date of Patent: Nov. 18, 2014

(54) OPERATION TERMINAL AND SCREEN IMAGE DISPLAY METHOD FOR OPERATION TERMINAL

(75) Inventors: Makoto Katsukura, Chiyoda-ku (JP); Masanori Nakata, Chiyoda-ku (JP); Yoshiaki Koizumi, Chiyoda-ku (JP); Takuya Mukai, Chiyoda-ku (JP); Noriyuki Kushiro, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 761 days.

(21) Appl. No.: 13/133,313

(22) PCT Filed: Jan. 19, 2010

(86) PCT No.: PCT/JP2010/000251
§ 371 (c)(1),
(2), (4) Date: Jun. 7, 2011

(87) PCT Pub. No.: WO2010/084730
PCT Pub. Date: Jul. 29, 2010

(65) Prior Publication Data

US 2011/0234607 A1 Sep. 29, 2011

(30) Foreign Application Priority Data

Jan. 23, 2009 (JP) ................................ 2009-012853

(51) Int. Cl.

| | |
|---|---|
| ***G06T 1/00*** | (2006.01) |
| ***G06T 15/00*** | (2011.01) |
| ***G09G 5/36*** | (2006.01) |
| ***G08C 17/00*** | (2006.01) |
| *G09G 5/393* | (2006.01) |

(52) U.S. Cl.
CPC .......... *G08C 17/00* (2013.01); *G09G 2330/021* (2013.01); *G09G 5/393* (2013.01); *G09G 2380/06* (2013.01); *G08C 2201/30* (2013.01); *G09G 5/363* (2013.01); *G09G 2360/08* (2013.01)
USPC .......................................... 345/522; 345/547

(58) Field of Classification Search
CPC ....... G06T 1/00–1/0092; G06T 15/00–15/005; G06T 1/60; G09G 5/36–5/366; G06F 15/00
USPC .................................. 345/522, 547, 501, 530
See application file for complete search history.

(56) References Cited

U.S. PATENT DOCUMENTS

| | | | |
|---|---|---|---|
| 6,466,233 | B1 | 10/2002 | Mitani |
| 2001/0011953 | A1 | 8/2001 | Shintani et al. |

(Continued)

FOREIGN PATENT DOCUMENTS

| | | | |
|---|---|---|---|
| JP | 5-145973 | A | 6/1993 |
| JP | 9-116985 | A | 5/1997 |

(Continued)

OTHER PUBLICATIONS

International Search Report (PCT/ISA/210) issued on Apr. 20, 2010, by Japanese Patent Office as the International Searching Authority for International Application No. PCT/JP2010/000251.

(Continued)

*Primary Examiner* — Jacinta M Crawford
(74) *Attorney, Agent, or Firm* — Buchanan Ingersoll & Rooney PC

(57) ABSTRACT

An operation terminal for remotely operating an electronic apparatus includes a processing unit for remotely communicating with the electronic apparatus in accordance with a program, a memory on which the processing unit performs writing or reading of data, a nonvolatile memory for storing a basic screen image drawing command for drawing a basic screen image that is displayed before the operation terminal is operated, a drawing processor for creating a bitmapped image of the basic screen image in accordance with the basic screen image drawing command, and a display unit for displaying the bitmapped image on a screen.

12 Claims, 8 Drawing Sheets

(56) References Cited

U.S. PATENT DOCUMENTS

| | | | | |
|---|---|---|---|---|
| 2009/0303557 | A1* | 12/2009 | Nishimura | 358/527 |
| 2011/0102317 | A1 | 5/2011 | Katsukura et al. | |

FOREIGN PATENT DOCUMENTS

| | | | |
|---|---|---|---|
| JP | 2000-217171 | A | 8/2000 |
| JP | 2000-340372 | A | 12/2000 |
| JP | 3763418 | B2 | 4/2006 |
| JP | 2008-293321 | | 12/2008 |

OTHER PUBLICATIONS

Chinese Office Action (Text Portion of the Notification of the First Office Action) dated Aug. 13, 2013, issued by the Chinese Patent Office in corresponding Chinese Patent Application No. 201080004914.5, and English language translation of Office Action. (9 pages).

Office Action (Notification of Reasons for Refusal) dated Jan. 4, 2012, issued in the corresponding Japanese Patent Application No. 2009-012853, and an English Translation thereof. (4 pages).

Extended European Search Report Issued Feb. 21, 2014, by the European Patent Office in corresponding European Patent Application No. 10733338.7. (7 pages).

Office Action issued on Apr. 9, 2014, by the Chinese Patent Office in corresponding Chinese Patent Application No. 201080004914.5, and an English Translation of the Office Action. (14 pages).

* cited by examiner

OPERATION TERMINAL AND SCREEN IMAGE DISPLAY METHOD FOR OPERATION TERMINAL

TECHNICAL FIELD

The present invention relates to an operation terminal for remotely operating an electronic apparatus and a screen image display method for the operation terminal.

BACKGROUND ART

In recent years, with the widespread use of liquid crystal panels, graphical user interfaces (GUIs) are increasingly becoming popular.

GUIs that have been used in only high-performance personal computers are increasingly used for the user interface of remote controllers for facility equipment. The reason for this is there are advantages that usage of GUIs enable to suppress the increase in the number of switches and the like with the increase in the functionality of the remote controllers and that users can intuitively and easily operate the remote controllers.

The number of commands required for GUI processing is large, and the GUI processing therefore consumes large part of a computational resource of a Central Processing Unit (CPU), a microcontroller, or the like.

On the other hand, in general, a low-performance processing unit such as a microcontroller is used in a remote controller for facility equipment from the viewpoints of cost efficiency, heat generation, and power consumption.

When a GUI is used as a user interface for the remote controller, the execution of an application program for the operation of the remote controller itself may be therefore delayed.

In addition, GUI processing requires a large amount of memory since bitmapped screen images are created in the memory. Accordingly, it is necessary to dispose a large-capacity memory in the remote controller.

Related to the above, as an object "to provide an excellent network-ready lighting control system including a remote monitor capable of performing an operation similar to that of a lighting controller without using many memory resources", a technique that "when the touch panel of a remote monitor 2 having no screen application is operated, a recognized object number on a screen is transmitted to a lighting controller 1 and the lighting controller 1 having a screen application searches for frame data to be drawn on the remote monitor 2 on the basis of the received object and transmits the frame data to the remote monitor 2" is disclosed (Patent Literature 1).

CITATION LIST

Patent Literature

Patent Literature 1: Japanese Unexamined Patent Application Publication No. 2000-340372 (Abstract)

SUMMARY OF INVENTION

Technical Problem

A remote controller for electronic equipment such as facility equipment needs to instantaneously reflect a result of input such as user's button pressing and to quickly notify the user that the processing has been received.

Using the technique disclosed in PTL 1, it takes time to transfer drawing data from the lighting controller 1 to the remote monitor 2 and display an image on the remote monitor 2 with the drawing data. Since the quality of communication between the lighting controller 1 and the remote monitor 2 is not always stable, it is difficult to guarantee a quick response to a user's action.

The present invention solves the above-described problems by providing a remote operation terminal that has a GUI function for achieving high responsivity and includes a low-speed processing unit and a small-capacity memory.

Solution to Problem

An operation terminal according to the present invention remotely operates an electronic apparatus. The operation terminal includes a processing unit configured to remotely communicate with said electronic apparatus in accordance with an operation specified by a program, a memory on which said processing unit performs writing or reading of data, a nonvolatile memory configured to store a basic screen image drawing command for drawing a basic screen image that is displayed before said operation terminal is operated, a drawing processor configured to create a bitmapped image of said basic screen image in accordance with said basic screen image drawing command, and a display unit configured to display said bitmapped image of said basic screen image on a screen.

Advantageous Effects of Invention

Since an operation terminal according to the present invention includes a drawing processor for performing drawing processing with a GUI in addition to a processing unit, it is possible to reduce a processing load on the processing unit and achieve an operation terminal having a GUI with a low-speed processing unit.

In addition, since a basic screen image drawing command is stored in a nonvolatile memory different from a memory used for input/output of data by the processing unit, the capacity of the memory can be reduced.

DESCRIPTION OF EMBODIMENTS

Embodiment 1

Figure 1:
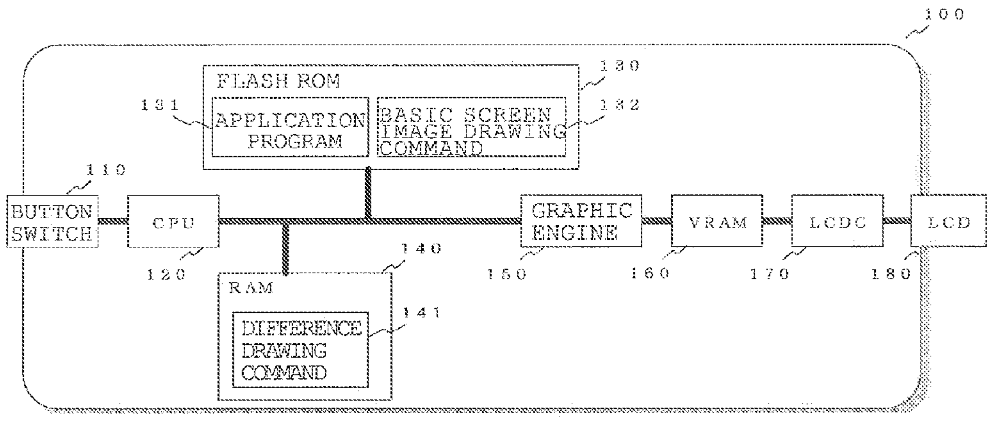
FIG. 1 is a functional block diagram of a facility equipment remote controller 100 according to Embodiment 1.

FIG. 1 is a functional block diagram of a facility equipment remote controller 100 according to Embodiment 1 of the present invention. The facility equipment remote controller 100 is an operation terminal for remotely operating facility equipment such as an air conditioner.

The facility equipment remote controller 100 includes a button switch 110, a CPU 120, a flash Read-Only Memory (ROM) 130, a Random Access Memory (RAM) 140, a graphic engine 150, a Video RAM (VRAM) 160, a Liquid Crystal Display Controller (LCDC) 170, and a Liquid Crystal Display (LCD) 180.

The button switch 110 is formed of a push button with which a user operates the facility equipment remote controller 100.

When the button switch 110 is pressed down or is returned to its original state, each electric signal indicating the state of the button switch 110 is input into a predetermined port of the CPU 120. The CPU 120 can recognize the press state of the button switch 110 on the basis of a voltage change at the port.

The CPU 120 and the graphic engine 150 are processing units for performing processing to be described later, and operate independently of each other in different clock frequencies.

The CPU 120, the flash ROM 130, the RAM 140, and the graphic engine 150 may be disposed on the same semiconductor chip, or may be individually disposed on a plurality of semiconductor chips that are connected to one another.

When they are disposed on the same semiconductor chip, as compared with a case in which they are disposed on a plurality of semiconductor chips, a transmission delay, loss of time or the like caused by an information exchange among these semiconductor chips rarely occurs, which has advantage.

Alternatively, they may be disposed in a Complex Programmable Logic Device (CPLD) or a Field Programmable Gate Array (FPGA) that can form a logic circuit, or may be disposed as ICs such as Application Specific Integrated Circuits (ASICs).

The CPU 120 executes an operation for remotely operating facility equipment in accordance with an operation specified by an application program 131 developed by an application developer.

The application program 131 includes, for example, a control program for facility equipment, a communication program, etc. The application program 131 is stored in the flash ROM 130, is read into the RAM 140 when the CPU 120 is operated, and is then executed by the CPU 120.

The graphic engine 150 performs drawing processing on a GUI screen. The drawing processing will be described in detail later.

The graphic engine 150 is connected to the CPU 120, the flash ROM 130, and the RAM 140 via a bus line for transmitting data with an electric signal.

In order to exchange data between the VRAM 160 and the graphic engine 150 with an electric signal, the I/O ports of the VRAM 160 and the graphic engine 150 are connected to each other.

The flash ROM 130 and the RAM 140 share the same address bus. That is, each of the graphic engine 150 and the CPU 120 does not recognize a physical difference between these memories and distinguishes between them on the basis of only their addresses.

A time required for writing to the flash ROM 130 is much longer, for example, 10000 times longer, than a time required for writing to the RAM 140. There is no big difference between times required for reading from the flash ROM 130 and the RAM 140.

The graphic engine 150 and the CPU 120 negotiate the operations each other on the bus line.

While the CPU 120 writes data into the flash ROM 130 or the RAM 140, the CPU 120 sets the level of a BUSY port, which is not illustrated, on the bus line to HIGH. As a result, the graphic engine 150 recognizes that data is being written into the flash ROM 130 or the RAM 140.

At that time, when the graphic engine 150 tries to read out data from the flash ROM 130 or the RAM 140, the reading processing is blocked. The graphic engine 150 waits until the level of a BUSY signal goes LOW.

When the graphic engine 150 writes data into the flash ROM 130 or the

RAM 140, the graphic engine 150 sets the level of the BUSY port to HIGH and the CPU 120 waits until the level of the BUISY port goes to LOW.

An "operation terminal" according to Embodiment 1 corresponds to the facility equipment remote controller 100.

A "processing unit" according to Embodiment 1 corresponds to the CPU 120.

A "nonvolatile memory" according to Embodiment 1 corresponds to the flash ROM 130.

A "drawing processor" according to Embodiment 1 corresponds to the graphic engine 150.

A "video memory" according to Embodiment 1 corresponds to the VRAM 160.

A "display unit" according to Embodiment 1 corresponds to the LCD 180.

The configuration of the facility equipment remote controller 100 has been described.

Next, a screen image display process that is performed by the facility equipment remote controller 100 and that includes the following steps (1) to (3) will be described.

(1) The CPU 120 reads out the application program 131 stored in the flash ROM 130 and operates in accordance with an operation specified by the application program 131. The description of the fact that the CPU 120 operates in accordance with the operation specified by the application program 131 will be omitted below as appropriate.

(2) The CPU 120 issues a drawing command for causing the graphic engine 150 to draw, and writes it into the flash ROM 130.

Here, the issue of a drawing command means that the drawing command is generated including an appropriate argument in a correct order. The drawing command is a command in a binary format understandable for the graphic engine 150. For example, the drawing command includes starting coordinates, end coordinates, a color, and a width of a line, and a command such as actually drawing the line on a bitmapped image in the VRAM 160.

(3) The graphic engine 150 performs drawing processing in accordance with the drawing commands, creates a bitmapped screen image, and writes the bitmapped screen image into the VRAM 160.

(3.1) Supplemental Information about Screen Image Type

There are two types of displayed screen images, a basic screen image and an operation screen image.

The basic screen image is displayed when a user does not operate the facility equipment remote controller 100. The operation screen image is displayed when a user operates the facility equipment remote controller 100.

(3.2) Supplemental Information about Drawing Command Type

A drawing command for drawing a basic screen image is called a basic screen image drawing command 132. A drawing command for drawing the difference between a basic screen image and an operation screen image is called a difference drawing command 141. The graphic engine 150 executes the basic screen image drawing command 132 and the difference drawing command 141 in this order so as to draw the operation screen image.

(3.3) Supplemental Information about Placement of Drawing Command in Memory

The basic screen image drawing command 132 is placed from a predetermined address in the flash ROM 130. The difference drawing command 141 is placed from a predetermined address in the RAM 140. A delimiter command is placed at the ends of the basic screen image drawing command 132 and the difference drawing command 141.

Each initial address of the basic screen image drawing command 132 and the difference drawing command 141 is stored in a register (not illustrated) included in the graphic engine 150.

The graphic engine 150 refers to the value in the register as appropriate and reads out the basic screen image drawing command 132 or the difference drawing command 141.

(4) A bitmapped image in the VRAM 160 is displayed on the LCD 180 via the externally connected LCDC 170.

(4.1) Supplemental Information about VRAM Size

The size of address space of the VRAM 160 is determined in accordance with the screen size of the LCD 180.

For example, when the size of an LCD is 640 pixels wide by 480 pixels high, the VRAM 160 has 307200 (640×480) storage data elements.

The number of bytes required by a single storage data element is determined in accordance with the number of colors that can be displayed by the LCD 180. When the LCD 180 can display a 24-bit full-color image, three bytes are needed for a signal storage data element. In this case, the size of the VRAM 160 is set to 900 Kbytes.

Thus, the size of the VRAM 160 is set as appropriate in accordance with the performance of the LCD 180.

(4.2) Supplemental Information about Effect of VRAM

The size of the VRAM 160 suffices with the size required by the LCD 180. On the other hand, when a bitmapped image is stored in the RAM 140, the RAM 140 needs to have a sufficient size to keep a storage area required for the operation of the CPU 120.

That is, by disposing the VRAM 160 dedicated to GUI drawing, it is possible to conserve an overall memory capacity.

The screen image display process performed by the facility equipment remote controller 100 has been described.

Next, details of the screen image display process will be described.

Figure 2:
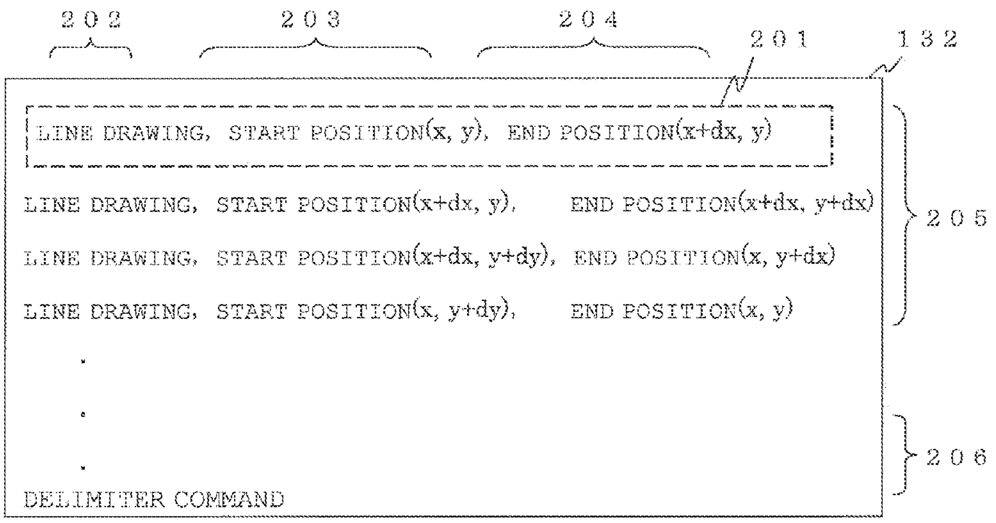
FIG. 2 is a diagram illustrating an exemplary structure of a basic screen image drawing command 132.

FIG. 2 is a diagram illustrating an exemplary structure of the basic screen image drawing command 132. The drawing command is binary data represented by 0 and 1, but is represented by a character string in FIG. 2 for the sake of explanation.

A drawing command 205 includes a plurality of individual drawing commands 201 each used to transmit an instruction such as drawing a line, a circle, a dot, a square, a polygon to the graphic engine 150.

The individual drawing command 201 includes a single drawing element and a plurality of drawing arguments. For example, the individual drawing command 201 illustrated in the figure includes a drawing element 202, a start position 203, and an end position 204.

The individual drawing command 201 is a command for drawing a display element such as a line or a circle on a screen displayed by the LCD 180. Here, as an example of a command for drawing a line, binary data represented by "line drawing", "start position (x, y)", and "end position (x+dx, y)" is illustrated.

The drawing element 202 "line drawing" means that a line is to be drawn on a bitmapped screen image in the VRAM 160.

At the end of the basic screen image drawing command 132, a delimiter command 206 is inserted.

The graphic engine 150 reads and executes drawing commands on a line-by-line basis. The graphic engine 150 recognizes the end of the basic screen image drawing command by reading out the delimiter command 206.

The structure of the difference drawing command 141 is similar to that of the basic screen image drawing command 132.

Figure 3:
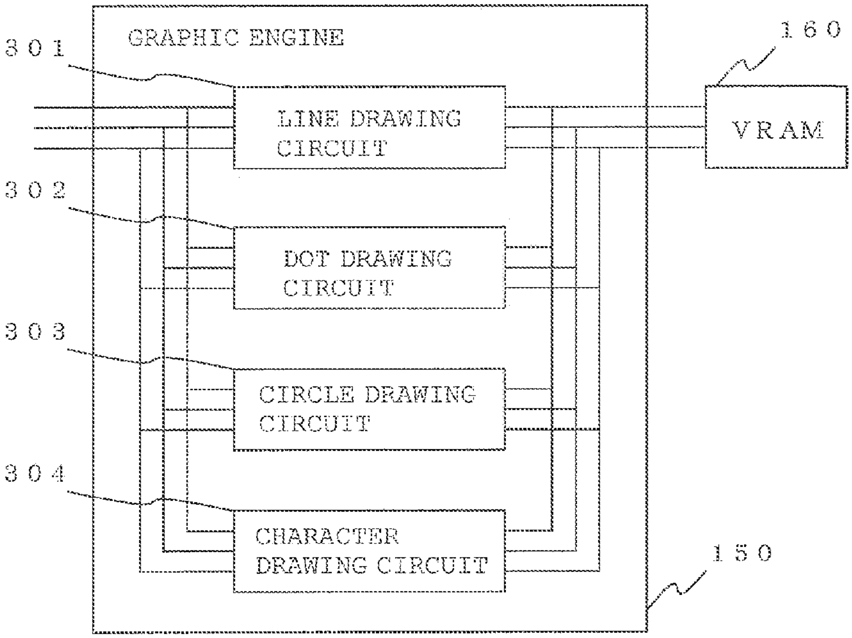
FIG. 3 is a diagram illustrating a detailed configuration of a graphic engine 150.

FIG. 3 is a diagram illustrating the detailed configuration of the graphic engine 150.

The graphic engine 150 includes different drawing circuits for elements to be drawn such as a line, a dot, a circle, a square, and a character. Referring to FIG. 3, an example having a line drawing circuit 301, a dot drawing circuit 302, a circle drawing circuit 303, and a character drawing circuit 304 is shown.

Each drawing circuit can be formed of, for example, a logic circuit on the basis of a predetermined known algorithm. Each drawing circuit receives an input and writes a graphics primitive that is a basic drawing element such as a line, a dot, a circle, a square, or a character into the VRAM 160 as a bitmapped image.

The graphic engine 150 reads out drawing commands and sorts them into drawing circuits. For example, a line drawing command and a circle drawing command are transmitted to the line drawing circuit 301 and the circle drawing circuit 303, respectively. The transmission of commands is performed on the basis of the circuit selection bits, which is not illustrated, of the drawing circuits.

Figure 4:
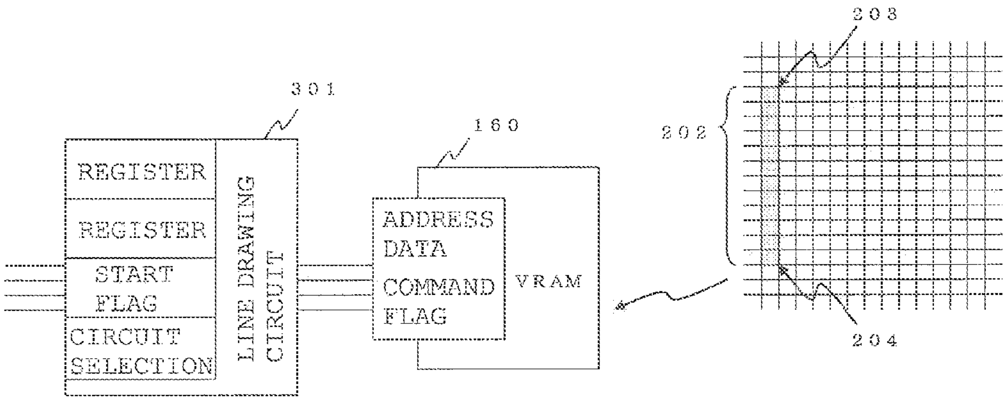
FIG. 4 is a diagram illustrating a configuration of a line drawing circuit 301 in the graphic engine 150.

FIG. 4 is a diagram illustrating the configuration of the line drawing circuit 301 in the graphic engine 150. It is noted that the drawing circuits other than the line drawing circuit 301 illustrated in FIG. 3 have the same basic configuration.

The line drawing circuit 301 receives two pieces of coordinate data, the start position 203 and the end position 204, as input values. The start position 203 and the end position 204 are stored in predetermined registers in the line drawing circuit 301.

The line drawing circuit 301 writes a bitmapped image of the drawing element 202 into the VRAM 160 by drawing a line from the start position 203 to the end position 204. On the right side of FIG. 4, a bitmapped image of a line written into the VRAM 160 is illustrated.

In the VRAM 160, each address corresponding to an X coordinate and a Y coordinate on the LCD 180 is set. The line drawing circuit 301 creates a bitmapped image in the VRAM 160 by writing a line at a corresponding address in the VRAM 160 with specified color data.

The LCDC 108 displays the bitmapped image stored in the VRAM 160 on the LCD 180.

The screen image display process has been described in detail.

Next, the GUI property of the facility equipment remote controller 100 will be described.

Figure 5:
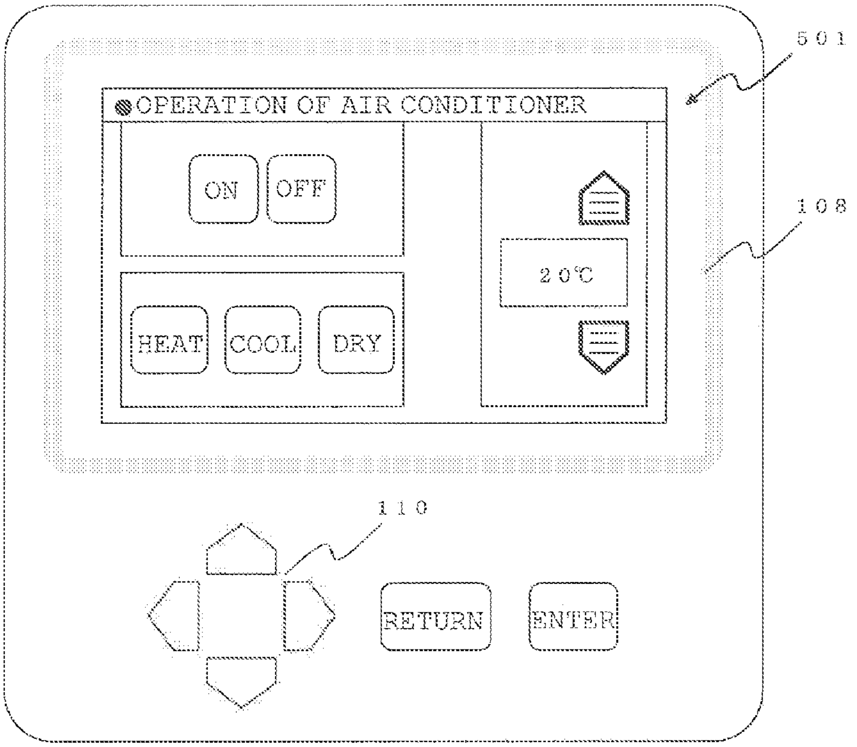
FIG. 5 is a diagram illustrating an example of a screen of the facility equipment remote controller 100.

FIG. 5 is a diagram illustrating an example of a screen of the facility equipment remote controller 100.

In the facility equipment remote controller, instead of mechanical buttons or indicators, buttons and characters drawn on the LCD 180 with software are used. A user inputs a desired operational instruction into the remote controller with the mechanical button switch 110 near the edge of the remote controller.

The number of mechanical switches is smaller than that of buttons on the screen. Accordingly, a meta function allowing a user to press down one of buttons such as cursor keys and an enter key on the screen is assigned to each of the mechanical switches.

In the facility equipment remote controller, almost display screen changes are a movement of a cursor, the display of a software button in inverse video, and a change of a displayed value and the change of whole display screen is rarely performed. This property is different from that of portable video game machines, mobile telephones, and information communications equipment having GUIs.

Next, an exemplary case in which the switching between screen images is performed in accordance with a user's operation will be described.

First, a user switches on the facility equipment remote controller 100. At that time, since there is no screen image data in the VRAM 160, no image is displayed on the LCD 180.

The CPU 120 reads out the application program 131 and creates a basic screen image 501 in accordance with the application program 131. The basic screen image 501 is a screen image displayed when a user does not operate. Switching the basic screen images is called screen image switching.

When the basic screen image 501 illustrated in FIG. 5 is displayed, the user presses down the button switch 110 placed at the bottom of the remote controller. At that time, a cursor appears in the screen image and moves in accordance with a user's operation.

Figure 6:
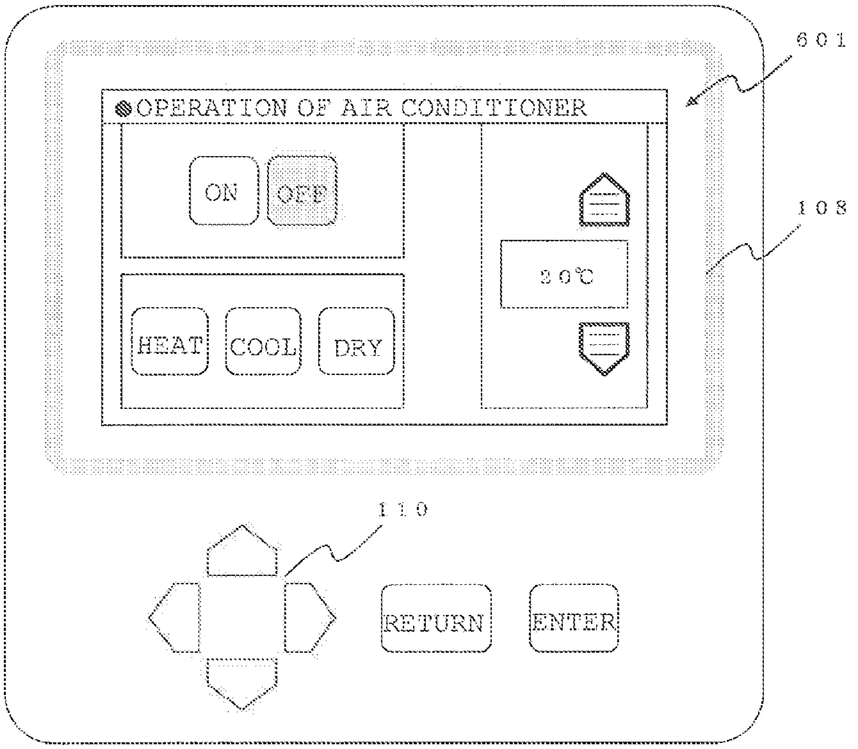
FIG. 6 is a diagram illustrating an operation screen image 601 displayed as a result of a user's operation.

FIG. 6 is an example of an operation screen image 601 displayed as a result of a user's operation. When the color of a software button on which "OFF" is marked is inverted, a user is notified that the current operation target is a software button "OFF".

At that time, by pressing down the button switch 110 labeled "ENTER" thereon and placed at the bottom of the remote controller, the user can perform an operation equivalent to pressing down the software button on which "OFF" is marked. Consequently, the user can remotely operate, for example, remotely power off an air conditioner.

Figure 7:
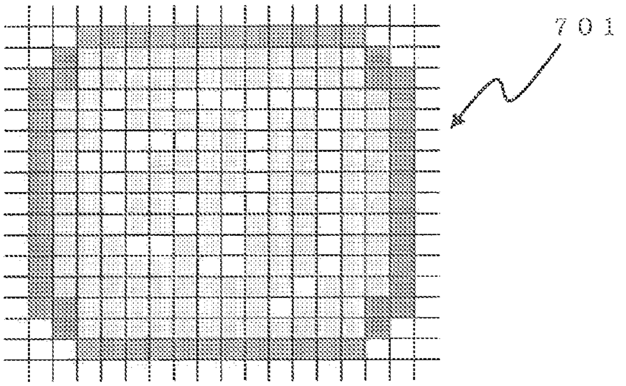
FIG. 7 is a diagram illustrating a difference bitmapped image 701 that is the difference between a basic screen image 501 illustrated in FIG. 5 and the operation screen image 601 illustrated in FIG. 6.

FIG. 7 is a diagram illustrating a difference bitmapped image 701 that is the difference between the basic screen image 501 illustrated in FIG. 5 and the operation screen image 601 illustrated in FIG. 6.

The difference between FIGS. 5 and 6 is only that the background color and character color of the software button on which "OFF" is marked are changed. Accordingly, the amount of data of the difference bitmapped image 701 is smaller than that of the operation screen image 601.

In order to obtain the operation screen image 601 illustrated in FIG. 6 from the basic screen image 501 illustrated in FIG. 5, only the difference bitmapped image 701 is written over the basic screen image 501.

Thus, in the facility equipment remote controller 100, the change from the basic screen image to the operation screen image is only a small part set by a user's action.

An exemplary case in which switching between screen images is performed in accordance with a user's operation has been described.

Next, the internal operation of the facility equipment remote controller 100 in a period between the power-on of the facility equipment remote controller 100 and the switching screen images will be described along with the linkage operation between functional units.

Figure 8:
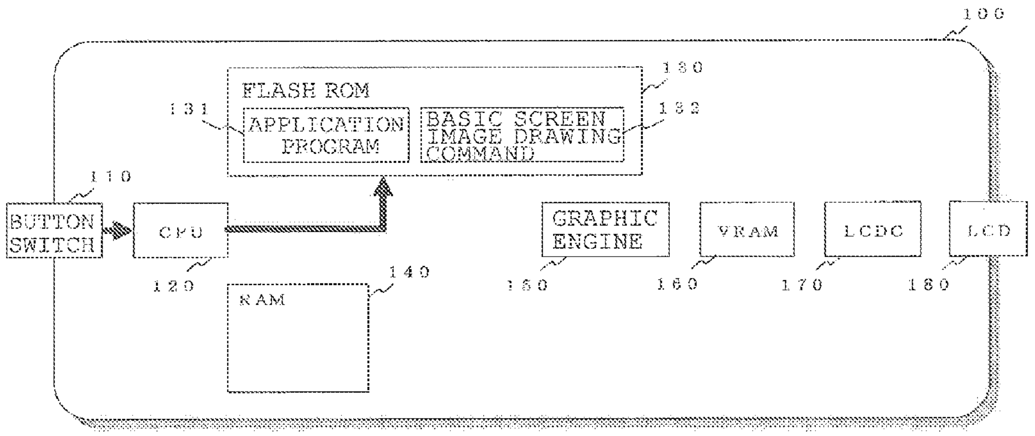
FIG. 8 is a flowchart illustrating an operation of a CPU 120.
Figure 9:
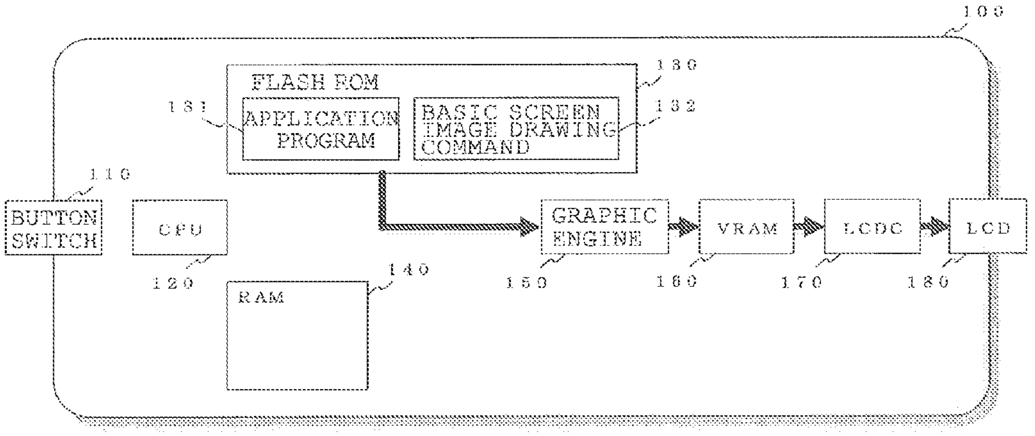
FIG. 9 is a flowchart illustrating an operation of the graphic engine 150.

FIGS. 8 and 9 are flow charts illustrating a process of drawing a basic screen image on the LCD 180 in the facility equipment remote controller 100 at the time of screen image switching. The screen image switching occurs only at the time of power-on, the change of an operation target or the like.

When the screen image switching occurs, the facility equipment remote controller 100 starts to create a bitmapped image of a basic screen image to be displayed on the LCD 180.

FIG. 8 is a flowchart illustrating the operation of the CPU 120.

The CPU 120 reads out the application program 131 from the flash ROM 130 and writes the basic screen image drawing command 132 for drawing a basic screen image into the flash ROM 130.

FIG. 9 is a flowchart illustrating the operation of the graphic engine 150.

The graphic engine 150 reads out the basic screen image drawing command 132 that has been written into the flash ROM 130, sequentially performs thereof, and creates a bitmapped image of a basic screen image in the VRAM 160.

The LCDC 170 periodically reads out a bitmapped image written in the VRAM 160, converts the bitmapped image into a signal sequence for display on the LCD 180, and outputs to the LCD 180.

The signal sequence may be compliant with a known standard such as the National Television Standards Committee (NTSC) or the Phase Alternating Line (PAL) or an original standard.

The LCD 180 is based on the standard, and the LCDC 170 compliant with the standard is selected and installed.

By performing the above-described process, a new basic screen image is displayed on the LCD 180 at the time of screen image switching.

Next, a process performed when a user presses down the button switch 110 will be described.

The change in the state of the button switch 110 triggers the CPU 120 in the facility equipment remote controller 100 to start to create a bitmapped image of the operation screen image to be displayed on the LCD 180.

Figure 10:
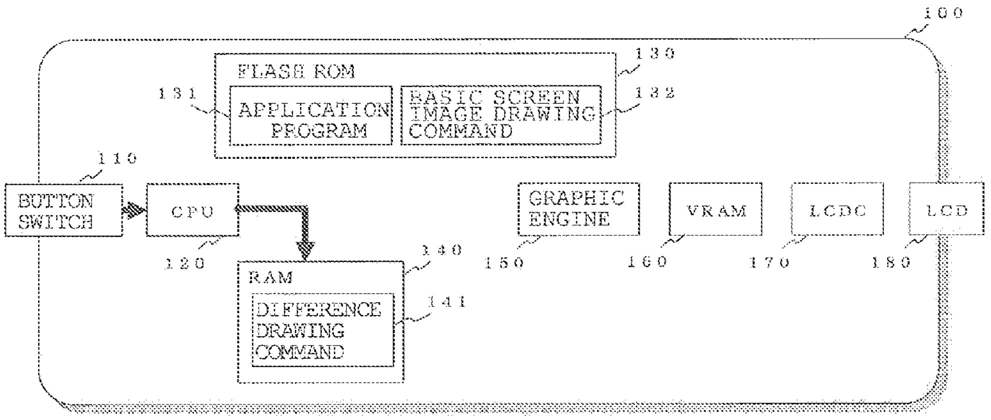
FIG. 10 is a flowchart illustrating an operation of the CPU 120.

FIG. 10 is a flowchart illustrating the operation of the CPU 120.

The CPU 120 has already written the basic screen image drawing command 132 for creating the basic screen image into the flash ROM 130. This is ensured because screen image switching occurs without fail at the time of power-on.

When the state of the button switch 110 is changed, the CPU 120 writes the difference drawing command 141 for drawing a changed portion of the screen image into the RAM 140 in accordance with the application program 131.

Subsequently, the graphic engine 150 reads out the basic screen image drawing command 132 from the flash ROM

130, sequentially performs drawing commands in the basic screen image drawing command 132, and writes a bitmapped image of the basic screen image into the VRAM 160.

Figure 11:
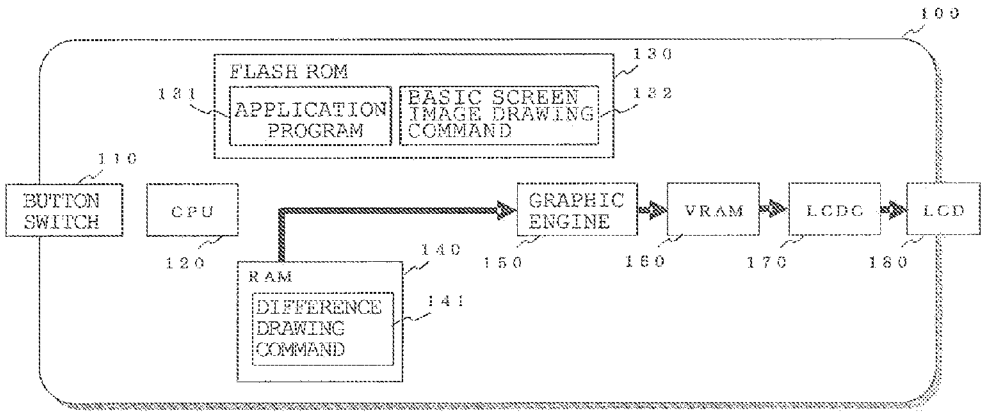
FIG. 11 is a flowchart illustrating an operation of the graphic engine 150.

FIG. 11 is a flow chart illustrating the operation of the graphic engine 150.

The graphic engine 150 reads out the difference drawing command 141 from the RAM 140, sequentially performs drawing commands in the difference drawing command 141, and writes a difference bitmapped image into the VRAM 160.

At that time, since the bitmapped image of the basic screen image is stored in the VRAM 160, the difference bitmapped image replaces a part of the bitmapped image of the basic screen image. Consequently, a bitmapped image of the operation screen image is created in the VRAM 160.

The LCDC 170 periodically reads out the bitmapped image from the VRAM 160, converts the bitmapped image into a signal sequence for displaying on the LCD 180, and outputs the signal sequence to the LCD 180.

Thus, the operation screen image is drawn on the LCD 180 in response to an action of the user on the button switch 110.

As described previously, the facility equipment remote controller 100 according to Embodiment 1 includes the graphic engine 150 in addition to the CPU 120, and the graphic engine 150 reads out a drawing command stored in a nonvolatile memory (the flash ROM 130) and draws a screen image.

That is, processing for drawing a bitmapped image with a GUI is separated from the CPU 120, and is performed by the graphic engine 150 instead of the CPU 120.

As a result, as compared with a case in which a screen image is drawn by the CPU 120 with software, a screen image drawing speed can be increased.

In the facility equipment remote controller 100 according to Embodiment 1, the CPU 120 and the graphic engine 150 operate in parallel.

As a result, by causing the CPU 120 to write the basic screen image drawing command 132 into the flash ROM 130 only once at the time of screen image switching, the subsequent drawing processing on the same screen image can be performed by only the graphic engine 150.

Accordingly, a computation resource of the CPU 120 does not need to be used for execution of GUI processing, and can be used for execution of programs.

In the facility equipment remote controller 100 according to Embodiment 1, the button switch 110 is disposed and the CPU 120 determines the depression state of the button switch 110 by measuring a voltage input into the port thereof.

As a result, the CPU 120 can determine which of the basic screen image and the operation screen image is displayed and can reduce power consumption by setting a sleep mode when the user does not operate the facility equipment remote controller 100.

In Embodiment 1, the size of the difference bitmapped image 701 is smaller than that of a screen image to be displayed and the number of drawing commands required for the difference bitmapped image 701 is also smaller than that required for the screen image. Accordingly, as compared with a case in which drawing commands required for display of an entire image are written into the RAM 140, it is possible to reduce a RAM capacity in the facility equipment remote controller 100.

In the facility equipment remote controller 100 according to Embodiment 1, bitmapped screen images are stored in the VRAM 160 dedicated to drawing processing.

Thus, by disposing the VRAM 160 and the RAM 140, the frequency of occurrence of a conflict between the graphic engine 150 and the CPU 120 over access to the same data is reduced.

In the facility equipment remote controller 100 according to Embodiment 1, drawing processing for creating a basic screen image and drawing processing for creating an operation screen image are separately performed and the operation screen image is created by adding a difference image to the basic screen image.

As a result, an operation screen image drawing speed can be increased. Furthermore, the required capacity of the RAM 140 can be reduced.

Embodiment 2

In Embodiment 1, the CPU 120 writes a difference drawing command into the RAM 140 and the graphic engine 150 writes a difference image into the VRAM 160 in accordance with the difference drawing command.

In Embodiment 2 of the present invention, the CPU 120 creates a difference image and writes the difference image into the VRAM 160.

Figure 12:
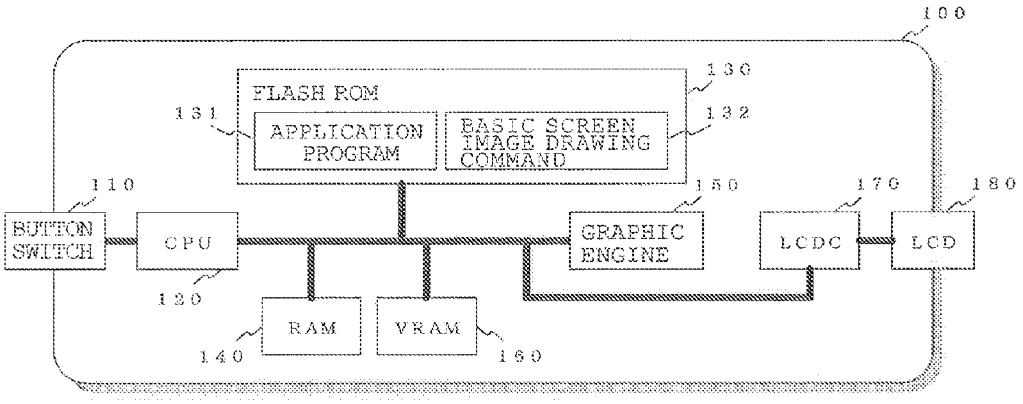
FIG. 12 is a functional block diagram of the facility equipment remote controller 100 according to Embodiment 2.

FIG. 12 is a functional block diagram of the facility equipment remote controller 100 according to Embodiment 2 of the present invention.

In Embodiment 2, the VRAM 160, the RAM 140, the CPU 120, and the graphic engine 150 are connected to one another on the same bus.

Other configurations are substantially the same as those described in Embodiment 1, but a screen image drawing operation according to Embodiment 2 is different from that according to Embodiment 1. Difference points between Embodiments 1 and 2 will be mainly described below.

Figure 13:
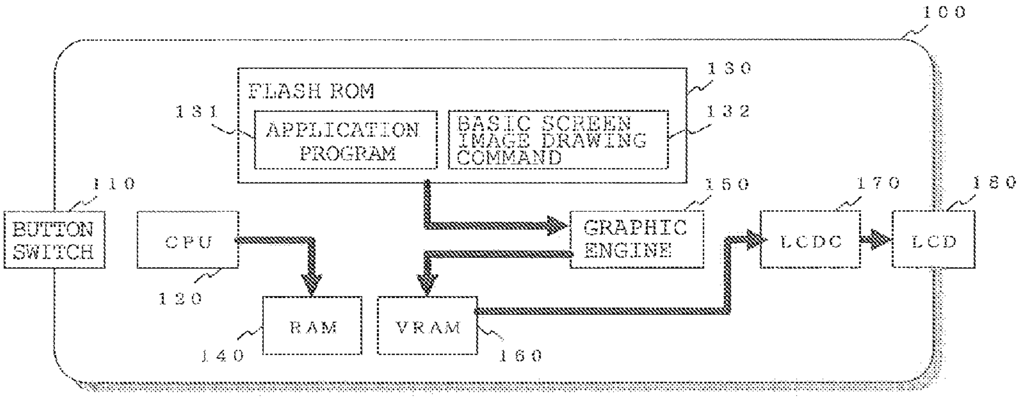
FIG. 13 is a flowchart illustrating a screen image drawing process according to Embodiment 2.

FIG. 13 is a flow chart illustrating a screen image drawing process according to Embodiment 2. A screen image drawing process from steps (1) to (6) will be described below with reference to FIG. 13.

(1) Like in Embodiment 1, the CPU 120 writes the basic screen image drawing command 132 into the flash ROM 130.

(2) The graphic engine 150 reads out the basic screen image drawing command 132 from the flash ROM 130 at the time of screen image switching and writes a bitmapped image of the basic screen image into the VRAM 160.

(3) When a user operates the button switch 110, the CPU 120 reads out a current bitmapped screen image from the VRAM 160. At that time, the CPU 120 reads out only a bitmapped screen image of a portion corresponding to a user's operation target from the VRAM 160.

(4) The CPU 120 performs color inversion computation on the bitmapped image read from the VRAM 160 so as to generate a difference image. The color inversion computation is converting an original color into a complementary color, for example, converting a white dot into a black dot.

(5) The CPU 120 writes the generated difference image into the VRAM 160.

(6) The LCDC 170 periodically reads out a bitmapped image from the VRAM 160 and displays the bitmapped image on the LCD 180.

A screen image drawing process according to Embodiment 2 has been described.

A difference image generation process performed by the CPU 120 is described in the application program 121 in advance for specification. The CPU 120 performs the above-described process in accordance with the application program.

As described above, in the facility equipment remote controller 100 according to Embodiment 2, the VRAM 160 and the CPU 120 are connected to each other on the same bus.

Accordingly, when the CPU 120 draws the operation screen image, the CPU 120 can directly write a difference image into the VRAM 160 without writing a difference drawing command into the RAM 140. As a result, the required capacity of the RAM 140 can be reduced.

In the facility equipment remote controller 100 according to Embodiment 2, when the CPU 120 draws the operation screen image, the CPU 120 reads out a bitmapped image from the VRAM 160 and generates a difference image with the read bitmapped image.

Accordingly, there is no need to store the same data in the RAM 140 two times and the amount of usage of the RAM 140 can be therefore reduced.

In the facility equipment remote controller 100 according to Embodiment 2, the CPU 120 directly writes a difference image into the VRAM 160.

Using this method, the number of drawing commands processed by the graphic engine 150 can be reduced and the screen response can be improved.

In the facility equipment remote controller 100 according to Embodiment 2, the CPU 120 generates a difference image by performing color inversion computation.

Using this method, it is possible to prevent the difference image from having the same color as a currently drawn image.

Embodiment 3

In Embodiment 3 of the present invention, the configuration which data can be written into the flash ROM 130 from out of the facility equipment remote controller 100 and a screen image drawing operation using this configuration will be described. Other configurations are the same as those described in Embodiments 1 and 2.

The following description will be made on the basis of the configuration according to Embodiment 1, but it is noted that a similar effect can be obtained using the configuration according to Embodiment 2.

Figure 14:
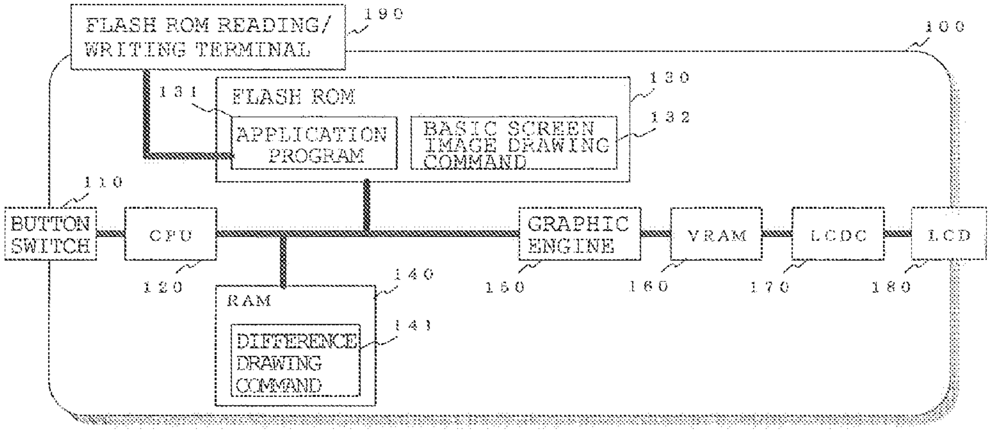
FIG. 14 is a functional block diagram of the facility equipment remote controller 100 according to Embodiment 3.

FIG. 14 is a functional block diagram of the facility equipment remote controller 100 according to Embodiment 3.

The facility equipment remote controller 100 according to Embodiment 3 includes a flash ROM reading/writing terminal 1401.

The flash ROM reading/writing terminal 1401 is a terminal electrically connected to a reading/writing port of the flash ROM 130. By externally connecting a flash ROM writing apparatus 1501 to the facility equipment remote controller 100, it is possible to externally write data into the flash ROM 130 in the facility equipment remote controller 100.

The flash ROM writing apparatus 1501 may be a dedicated writing apparatus or a general-purpose apparatus such as a personal computer.

In Embodiment 3, a user externally writes the basic screen image drawing command 132 into the flash ROM 130 in the facility equipment remote controller 100 using the flash ROM reading/writing terminal 1401, and the basic screen image drawing command 132 is used for drawing of a basic screen image.

Figure 15:
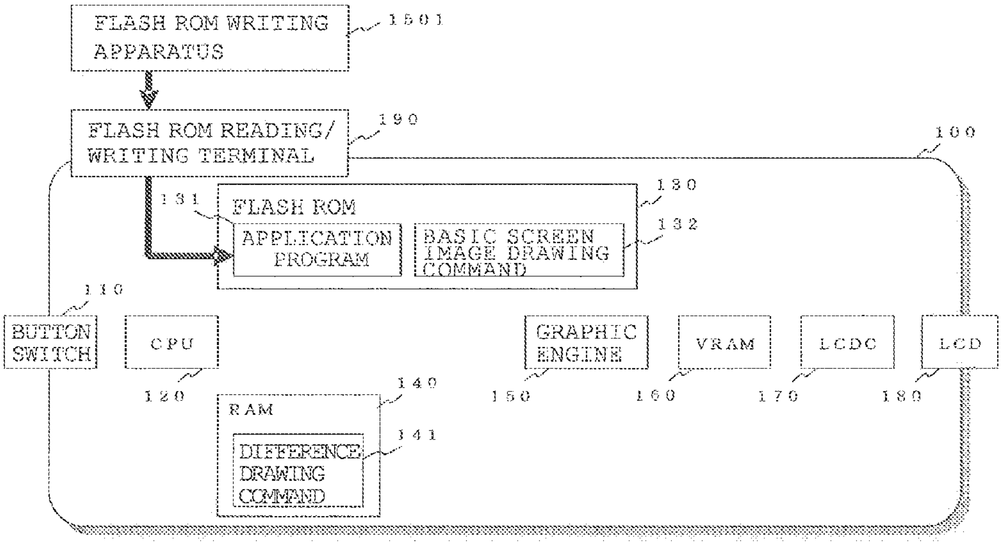
FIG. 15 is a flowchart illustrating a process of causing a flash ROM writing apparatus 1501 to write the basic screen image drawing command 132 into a flash ROM 130.

FIG. 15 is a flowchart illustrating the process of causing the flash ROM writing apparatus 1501 to write the basic screen image drawing command 132 into the flash ROM 130. The process includes steps (1) to (4) and will be described with reference to FIG. 15.

(1) A user connects the flash ROM writing apparatus 1501 to the flash ROM reading/writing terminal 1401 before switching on the facility equipment remote controller 100.

(2) The flash ROM writing apparatus 1501 writes the basic screen image drawing command 132 for drawing a basic screen image into the flash ROM 130.

(3) An initial address of the basic screen image drawing command 132 is described in the application program 131 as a table. Alternatively, the flash ROM writing apparatus 1501 may write the table at a predetermined address in the flash ROM 130.

The CPU 120 refers to the above-described table so as to acquire the initial address of the basic screen image drawing command when drawing a basic screen image and writes the initial address into a register (not illustrated) in the graphic engine 150. When the basic screen image drawing command is not written in the flash ROM 130, like in other embodiments, the basic screen image drawing command may be generated and then be written into the flash ROM 130.

(4) The graphic engine 150 sequentially executes drawing commands starting from the address represented by a newly written register value. When the graphic engine 150 reads out a delimiter command, the drawing process ends.

Thus, the basic screen image drawing command 132 is written from the flash ROM writing apparatus 1501 externally connected to the facility equipment remote controller 100 according to Embodiment 3 into the flash ROM 130.

Since the flash ROM writing apparatus 1501 is disposed outside the facility equipment remote controller 100, the basic screen image drawing command 132 can be written into the flash ROM 130 in advance before the CPU 120 in the facility equipment remote controller 100 is started.

As a result, on a screen displayed before the CPU 120 is started, for example, a start-up screen, the basic screen image can be displayed.

In Embodiment 3, when the VRAM 160 and the CPU 120 and the like are disposed on the same bus as described in Embodiment 2, the CPU 120 directly writes a difference image into the VRAM 160.

In this case, since the RAM 140 does not need to store the difference drawing command 141, the required capacity of the RAM 140 can be reduced.

Embodiment 4

In Embodiment 4 of the present invention, a plurality of basic screen images are set, the basic screen image drawing commands 132 for the basic screen images are written into the flash ROM 130, and switching among the basic screen images is performed by switching among the basic screen image drawing commands 132.

Since other configurations and other operations are the same as those described in Embodiments 1 to 3, different points will be mainly described below.

A screen image drawing processing of the facility equipment remote controller 100 will be described in the following steps (1) to (4) will be described using the configuration described in Embodiment 3 as an example. It is added that similar operations can be performed for the configurations described in other embodiments.

(1) The flash ROM writing apparatus 1501 writes the basic screen image drawing commands 132 for a plurality of basic screen images into the flash ROM 130. At that time, "a plurality of drawing commands for a basic screen image 1", "a plurality of drawing commands for a basic screen image 2", "a plurality of drawing commands for a basic screen image 3", and so on are arranged in this order at addresses in the flash ROM 130. Between the basic screen image drawing commands 132, a delimiter command is inserted.

(2) In the application program 131, the initial addresses of these basic screen image drawing commands in the flash ROM 130 are described in advance as a table. Alternatively, the flash ROM writing apparatus 1501 may write the table at a predetermined address in the flash ROM 130.

(3) The CPU 120 refers to the table when switching from a basic screen image to another basic screen image, acquires the initial address of the basic screen image drawing command 132 for the other basic screen image, and writes the initial address into a register (not illustrated) in the graphic engine 150.

(4) The graphic engine 150 sequentially executes drawing commands in the basic screen image drawing command starting from an address represented by a newly written register value. When the graphic engine 150 reads out a delimiter command, the process ends.

Thus, according to Embodiment 4, the CPU 120 can switch between display screen images only by rewriting a value in the register in the graphic engine 150. As a result, a time required for screen image switching can be markedly reduced.

When the configurations described in Embodiments 1 and 2 are employed, the CPU 120 writes the basic screen image drawing commands 132 corresponding to a plurality of basic screen images one by one into a flash ROM and stores writing destination addresses in the RAM 140 or the like.

Embodiment 5

In Embodiment 5 of the present invention, a detail example of the application program 131 will be described. Other configurations are the same as those described in Embodiments 1 to 4.

Figure 16:
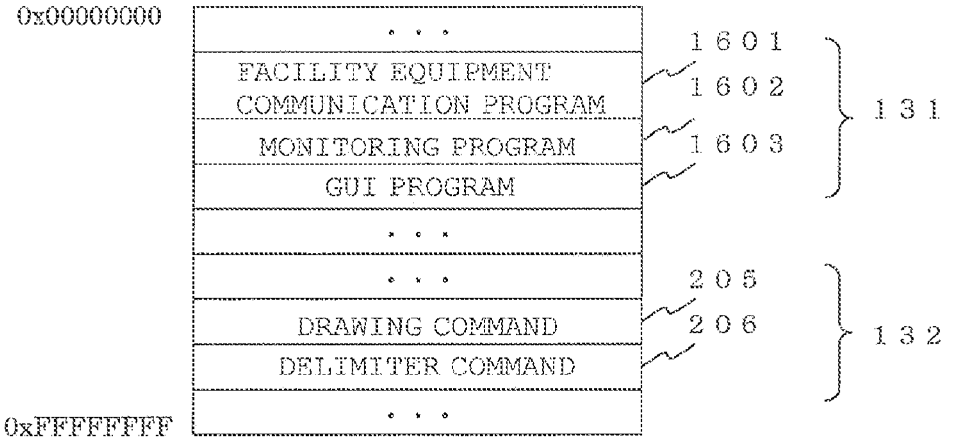
FIG. 16 is a diagram illustrating an exemplary structure of an application program 131 and the basic screen image drawing command 132 stored in the flash ROM 130.

FIG. 16 is a diagram illustrating an exemplary structure of the application program 131 and the basic screen image drawing command 132 stored in the flash ROM 130.

The application program 131 includes a facility equipment communication program 1601, a monitoring program 1602, and a GUI program 1603.

These programs are stored at different addresses individually. The basic screen image drawing command 132 is placed at a different address from the addresses of these programs. Subsequent to the drawing command 205, a delimiter command 206 is written.

The facility equipment communication program 1601 specifies an operation for communicating with facility equipment and acquiring status information of the facility equipment. The status information of facility equipment is, for example, a current set temperature or the state of a power supply.

The information is transferred to operations specified by the GUI program 1603 via the RAM 140 or the like. A result of a user's operation is similarly transferred to operations specified by the facility equipment communication program 1601 via the RAM 140 or the like.

Although every program is executed by the CPU 120, operations are performed as if information were transferred between programs apparently.

The monitoring program 1602 specifies an operation for monitoring the exchange of information between the facility equipment communication program 1601 and the GUI program 1603 and determining whether error information is exchanged.

The exchange of information between the facility equipment communication program 1601 and the GUI program 1603 is performed via, for example, a memory buffer disposed at a predetermined address in the RAM 140.

The CPU 120 checks contents of the memory buffer in accordance with the monitoring program 1602, and, when information is incorrect, writes an invalidation command into the RAM 140 so as to invalidate the information.

The GUI program 1603 specifies an operation for drawing a screen image on the basis of information transferred from the facility equipment communication program 1601 and a result of a user's operation.

Hitherto, it has been necessary to develop programs included in the application program 131 together so as to solve the problem of the reference relationship among them.

In Embodiment 5, as illustrated in FIG. 16, the facility equipment communication program 1601 and the GUI program 1603 are placed at different addresses and the exchange of information is performed via only a memory buffer.

As a result, these programs can be separately developed by different developers and development efficiency can be therefore improved.

In Embodiment 5, the CPU 120 monitors contents of the memory buffer in accordance with the monitoring program 1602.

As a result, it is possible to prevent an incorrect value to be erroneously transferred and improve the operational reliability of a software unit in the facility equipment remote controller 100.

REFERENCE SIGNS LIST

100 facility equipment remote controller
110 button switch
120 CPU
130 flash ROM
131 application program
132 basic screen image drawing command
140 RAM
141 difference drawing command
150 graphic engine
160 VRAM
170 LCDC
180 LCD
201 individual drawing command
202 drawing element
203 start position
204 end position
205 drawing command
206 delimiter command
301 line drawing circuit
302 dot drawing circuit
303 circle drawing circuit
304 character drawing circuit
1601 facility equipment communication program
1602 monitoring program
1603 GUI program
501 basic screen image
601 operation screen image
701 difference image
1401 flash ROM reading/writing terminal
1501 flash ROM writing apparatus

The invention claimed is:

1. An operation terminal for remotely operating an electronic apparatus comprising:

a processing unit configured to remotely communicate with said electronic apparatus in accordance with an operation specified by a program;

a memory on which said processing unit performs writing or reading of data;

a nonvolatile memory configured to store a basic screen image drawing command for drawing a basic screen image that is displayed before said operation terminal is operated;

a drawing processor configured to create a bitmapped image of said basic screen image in accordance with said basic screen image drawing command;

a display unit configured to display said bitmapped image on a screen; and an operation button configured to accept a pressing-down operation and output a signal indicating that operation, wherein, upon receiving said signal indicating that said operation button has been pressed down, said processing unit writes a difference drawing command for drawing a difference between an operation screen image that is displayed while said operation terminal is operated and said basic screen image into said memory, and wherein after reading out said basic screen image drawing command from said nonvolatile memory and creating said bitmapped image of said basic screen image, said drawing processor reads out said difference drawing command from said memory, creates a bitmapped image of said difference, and writes over said bitmapped image of said basic screen image.

2. The operation terminal of claim 1, wherein said processing unit writes said basic screen image drawing command into said nonvolatile memory at a time when said operation terminal is switched on.

3. The operation terminal of claim 2, wherein, upon receiving said signal indicating that said operation button has been pressed down, said processing unit outputs a drawing command for drawing said operation screen image that is displayed while said operation terminal is being operated.

4. The operation terminal of claim 1, further comprising a video memory configured to store a bitmapped image of a screen image displayed by said display unit, wherein said video memory is connected to said drawing processor and said display unit, and wherein said drawing processor writes the created bitmapped image of the screen image into said video memory.

5. The operation terminal of claim 1, further comprising a terminal used to write said basic screen image drawing command into said nonvolatile memory from outside of said operation terminal, wherein, when said operation terminal is switched on, in the case where said basic screen image drawing command has already been written in said nonvolatile memory, said drawing processor creates a bitmapped image of said basic screen image in accordance with said basic screen image drawing command.

6. The operation terminal of claim 1, wherein said nonvolatile memory stores a communication program specifying an operation performed when said processing unit remotely communicates with said electronic apparatus and a drawing program specifying an operation performed when said processing unit outputs a screen image drawing command at different addresses respectively, wherein said processing unit remotely communicates with said electronic apparatus in accordance with the operation specified by said communication program and outputs the screen image drawing command in accordance with the operation specified by said drawing program.

7. The operation terminal of claim 6, wherein said nonvolatile memory stores a monitoring program specifying an operation performed when said processing unit checks whether there is incorrect data in said memory, wherein said processing unit writes data into said memory in accordance with the operation specified by said communication program or said drawing program, reads out said data from said memory in accordance with the operation specified by the other, and checks whether incorrect data has been written into said memory in accordance with the operation specified by said monitoring program.

8. The operation terminal of claim 1, wherein said drawing processor operates independently from said processing unit.

9. An operation terminal for remotely operating an electronic apparatus comprising:

a processing unit configured to remotely communicate with said electronic apparatus in accordance with an operation specified by a program;

a memory on which said processing unit performs writing or reading of data;

a nonvolatile memory configured to store a basic screen image drawing command for drawing a basic screen image that is displayed before said operation terminal is operated;

a drawing processor configured to create a bitmapped image of said basic screen image in accordance with said basic screen image drawing command; and a display unit configured to display said bitmapped image on a screen, wherein said nonvolatile memory stores each of a plurality of basic screen image drawing commands, corresponding to a plurality of basic screen images, at different addresses, wherein, when switching said basic screen images to other basic screen images, said processing unit notifies said drawing processor of a stored address of said basic screen image drawing command corresponding to a screen image after switching, and wherein said drawing processor reads out said basic screen image drawing command from the address and creates a bitmapped image of said basic screen image after switching.

10. A screen image display method of displaying a screen image on a display unit in an operation terminal for remotely operating an electronic apparatus, said operation terminal having:

a processing unit configured to remotely communicate with an electronic apparatus in accordance with an operation specified by a program;

a memory on which said processing unit performs writing or reading of data; and a drawing processor configured to operate independently of said processing unit to create a bitmapped image in accordance with a drawing command, said screen image display method comprising:

a first step of generating a basic screen image drawing command that draws a basic screen image displayed before said operation terminal is operated;

a second step for said processing unit to generate a drawing command for drawing an operation screen image that is displayed while said operation terminal is operated to write said drawing command for drawing said operation screen image into said memory;

a third step of creating a bitmapped image of said basic screen image in accordance with said basic screen image drawing command; and a fourth step for said drawing processor to read said drawing command for drawing said operation screen image from said memory to create a bitmapped image of said operation screen image in accordance with said drawing command for drawing said operation screen image and writing the same over the bitmapped image of said basic screen image.

11. The screen image display method of claim 10, wherein, in said second step, a difference drawing command for drawing a difference between said basic screen image and said operation screen image is generated, and wherein, in said fourth step, a bitmapped image of the difference between said basic screen image and said operation screen image is created in accordance with said difference drawing command, and is written over the bitmapped image of said basic screen image.

12. A screen image display method of displaying a screen image on a display unit in an operation terminal for remotely operating an electronic apparatus, said operation terminal having:

a processing unit configured to remotely communicate with an electronic apparatus in accordance with an operation specified by a program:

a memory to which said processing unit performs writing or reading of data; and a drawing processor configured to operate independently of said processing unit to create a bitmapped image in accordance with a drawing command, said screen image display method, comprising:

a first step of generating a basic screen image drawing command that draws a basic screen image displayed before said operation terminal is operated;

a second step of creating a bitmapped image of said basic screen image in accordance with said basic screen image drawing command;

a third step for said processing unit to create a bitmapped image of a difference between the bitmapped image of said basic screen image and a bitmapped image of an operation screen image that is displayed while said operation terminal is being operated to write said difference bitmapped image into said memory; and a fourth step for said drawing processor to read said difference bitmapped image from said memory to write the same over the bitmapped image of said basic screen image.

* * * * *